(12) United States Patent
Zhou et al.

(10) Patent No.: US 12,052,082 B2
(45) Date of Patent: Jul. 30, 2024

(54) SIDELINK BEAM MANAGEMENT

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/655,488

(22) Filed: Mar. 18, 2022

(65) Prior Publication Data

US 2023/0299836 A1   Sep. 21, 2023

(51) Int. Cl.
*H04B 7/06* (2006.01)
*H04W 16/28* (2009.01)
*H04W 92/18* (2009.01)

(52) U.S. Cl.
CPC .......... *H04B 7/0695* (2013.01); *H04W 16/28* (2013.01); *H04W 92/18* (2013.01)

(58) Field of Classification Search
CPC ..... H04B 7/0695; H04W 16/28; H04W 92/18
See application file for complete search history.

(56) References Cited

U.S. PATENT DOCUMENTS

| 2021/0219268 A1* | 7/2021 | Li | ........................ H04W 72/20 |
| 2023/0140393 A1* | 5/2023 | Guo | ................... H04B 7/06966 370/329 |
| 2023/0361955 A1* | 11/2023 | Ganesan | ............ H04B 7/06966 |

* cited by examiner

*Primary Examiner* — Kent Krueger
(74) *Attorney, Agent, or Firm* — Harrity & Harrity, LLP

(57) ABSTRACT

Various aspects of the present disclosure generally relate to wireless communication. In some aspects, a first user equipment (UE) may communicate with a second UE using a sidelink channel and a first beam. The UE may transmit a sidelink beam report associated with the first beam to a network entity. The UE may receive sidelink configuration information from the network entity that indicates to change from using the sidelink channel and the first beam to using the sidelink channel and a second beam. The UE may communicate with the second UE using the sidelink channel and the second beam. Numerous other aspects are described.

20 Claims, 9 Drawing Sheets

SIDELINK BEAM MANAGEMENT

FIELD OF THE DISCLOSURE

Aspects of the present disclosure generally relate to wireless communication and to techniques and apparatuses for sidelink beam management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include communicating with a second UE using a sidelink channel and a first beam. The method may include transmitting a sidelink beam report associated with the first beam to a network entity. The method may include receiving sidelink configuration information from the network entity that indicates to change from using the sidelink channel and the first beam to using the sidelink channel and a second beam. The method may include communicating with the second UE using the sidelink channel and the second beam.

Some aspects described herein relate to a method of wireless communication performed by a network entity. The method may include transmitting sidelink configuration information to a first UE or a second UE, the sidelink configuration information indicating to communicate using a sidelink channel between the first UE and the second UE and a first beam. The method may include receiving a sidelink beam report associated with the sidelink channel. The method may include transmitting updated sidelink configuration information to the first UE or the second UE, the updated sidelink configuration information at least indicating to communicate using the sidelink channel based at least in part on changing from the first beam a second beam.

Some aspects described herein relate to a non-transitory computer-readable medium that stores a set of instructions for wireless communication by a first UE. The set of instructions, when executed by one or more processors of the UE, may cause the UE to communicate with a second UE using a sidelink channel and a first beam. The set of instructions, when executed by one or more processors of the UE, may cause the UE to transmit a sidelink beam report associated with the first beam to a network entity. The set of instructions, when executed by one or more processors of the UE, may cause the UE to receive sidelink configuration information from the network entity that indicates to change from using the sidelink channel and the first beam to using the sidelink channel and a second beam. The set of instructions, when executed by one or more processors of the UE, may cause the UE to communicate with the second UE using the sidelink channel and the second beam.

Some aspects described herein relate to a non-transitory computer-readable medium that stores a set of instructions for wireless communication by a network entity. The set of instructions, when executed by one or more processors of the network entity, may cause the network entity to transmit sidelink configuration information to a first UE or a second UE, the sidelink configuration information indicating to communicate using a sidelink channel between the first UE and the second UE and a first beam. The set of instructions, when executed by one or more processors of the network entity, may cause the network entity to receive a sidelink beam report associated with the sidelink channel. The set of instructions, when executed by one or more processors of the network entity, may cause the network entity to transmit updated sidelink configuration information to the first UE or the second UE, the updated sidelink configuration information at least indicating to communicate using the sidelink channel based at least in part on changing from the first beam a second beam.

Some aspects described herein relate to an apparatus for wireless communication. The apparatus may include means for communicating with a second UE using a sidelink channel and a first beam. The apparatus may include means for transmitting a sidelink beam report associated with the first beam to a network entity. The apparatus may include means for receiving sidelink configuration information from the network entity that indicates to change from using the sidelink channel and the first beam to using the sidelink channel and a second beam. The apparatus may include means for communicating with the second UE using the sidelink channel and the second beam.

Some aspects described herein relate to an apparatus for wireless communication. The apparatus may include means for transmitting sidelink configuration information to a first UE or a second UE, the sidelink configuration information indicating to communicate using a sidelink channel between the first UE and the second UE and a first beam. The apparatus may include means for receiving a sidelink beam report associated with the sidelink channel. The apparatus may include means for transmitting updated sidelink configuration information to the first UE or the second UE, the updated sidelink configuration information at least indicating to communicate using the sidelink channel based at least in part on changing from the first beam a second beam.

Some aspects described herein relate to a first UE for wireless communication. The first user equipment may include a memory and one or more processors coupled to the memory. The one or more processors may be configured to communicate with a second UE using a sidelink channel and a first beam. The one or more processors may be configured to transmit a sidelink beam report associated with the first beam to a network entity. The one or more processors may be configured to receive sidelink configuration information from the network entity that indicates to change from using the sidelink channel and the first beam to using the sidelink channel and a second beam. The one or more processors may be configured to communicate with the second UE using the sidelink channel and the second beam.

Some aspects described herein relate to a network entity for wireless communication. The network entity may include a memory and one or more processors coupled to the memory. The one or more processors may be configured to transmit sidelink configuration information to a first UE or a second UE, the sidelink configuration information indicating to communicate using a sidelink channel between the first UE and the second UE and a first beam. The one or more processors may be configured to receive a sidelink beam report associated with the sidelink channel. The one or more processors may be configured to transmit updated sidelink configuration information to the first UE or the second UE, the updated sidelink configuration information at least indicating to communicate using the sidelink channel based at least in part on changing from the first beam a second beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
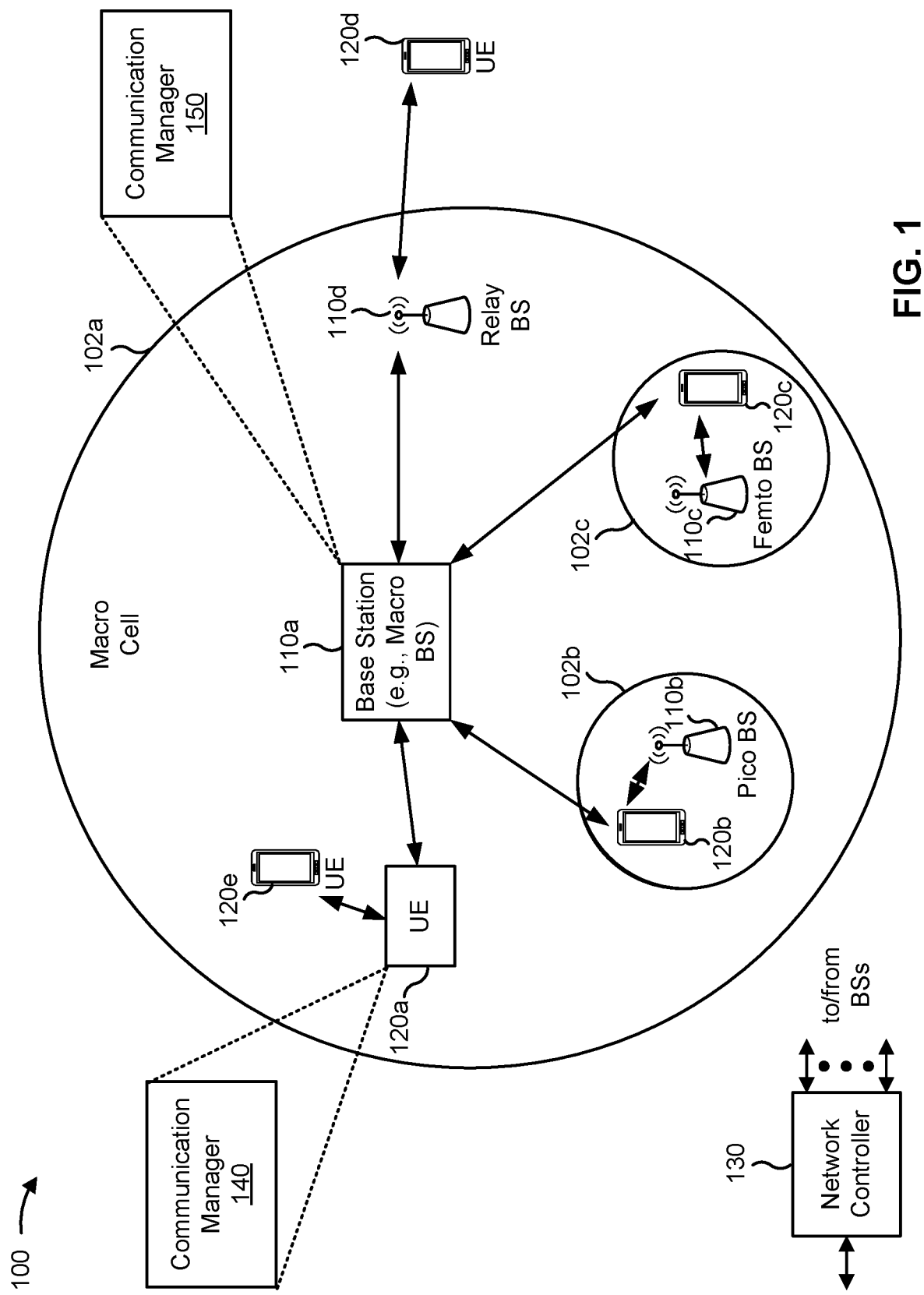
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may communicate with a second UE using a sidelink channel and a first beam; transmit a sidelink beam report associated with the first beam to a network entity; receive sidelink configuration information from the network entity that indicates to change from using the sidelink channel and the first beam to using the sidelink channel and a second beam; and communicate with the second UE using the sidelink channel and the second beam. Additionally, or alternatively, the communication manager 140 may perform one or more other operations described herein.

In some aspects, the network entity may include a communication manager 150. As described in more detail elsewhere herein, the communication manager 150 may transmit sidelink configuration information to a first user equipment (UE) or a second UE, the sidelink configuration information indicating to communicate using a sidelink channel between the first UE and the second UE and a first beam; receive a sidelink beam report associated with the sidelink channel; and transmit updated sidelink configuration information to the first UE or the second UE, the updated sidelink configuration information at least indicating to communicate using the sidelink channel based at least in part on changing from the first beam a second beam. Additionally, or alternatively, the communication manager 150 may perform one or more other operations described herein.

As indicated above, FIG. 1 is provided as an example. Other examples may differ from what is described with regard to FIG. 1.

Figure 2:
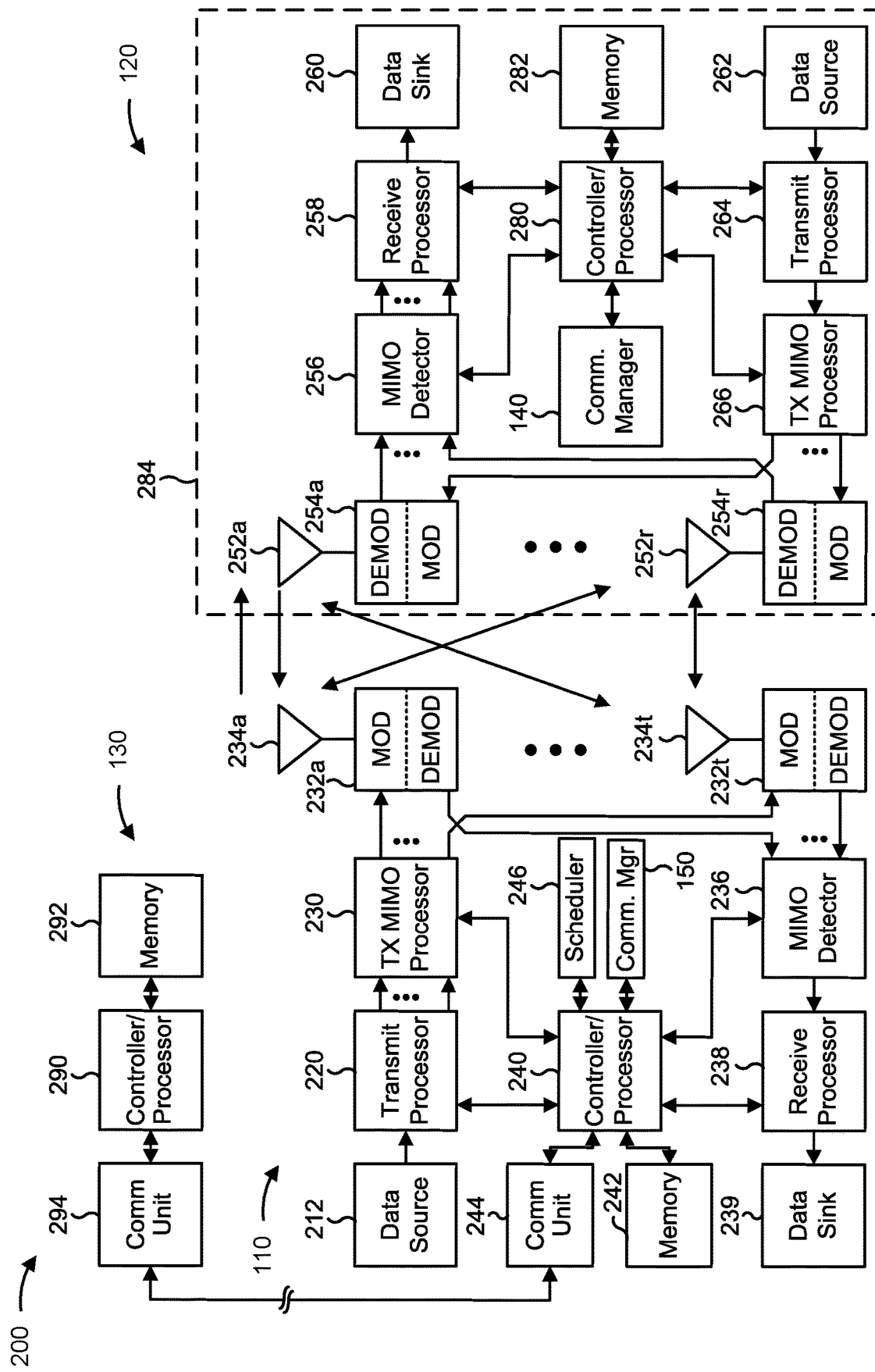
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as TX modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with sidelink beam management, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the first UE includes means for communicating with a second UE using a sidelink channel and a first beam; means for transmitting a sidelink beam report associated with the first beam to a network entity; means for receiving sidelink configuration information from the network entity that indicates to change from using the sidelink channel and the first beam to using the sidelink channel and a second beam; and/or means for communicating with the second UE using the sidelink channel and the second beam. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting sidelink configuration information to a first UE or a second UE, the sidelink configuration information indicating to communicate using a sidelink channel between the first UE and the second UE and a first beam; means for receiving a sidelink beam report associated with the sidelink channel; and/or means for transmitting updated sidelink configuration information to the first UE or the second UE, the updated sidelink configuration information at least indicating to communicate using the sidelink channel based at least in part on changing from the first beam a second beam. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
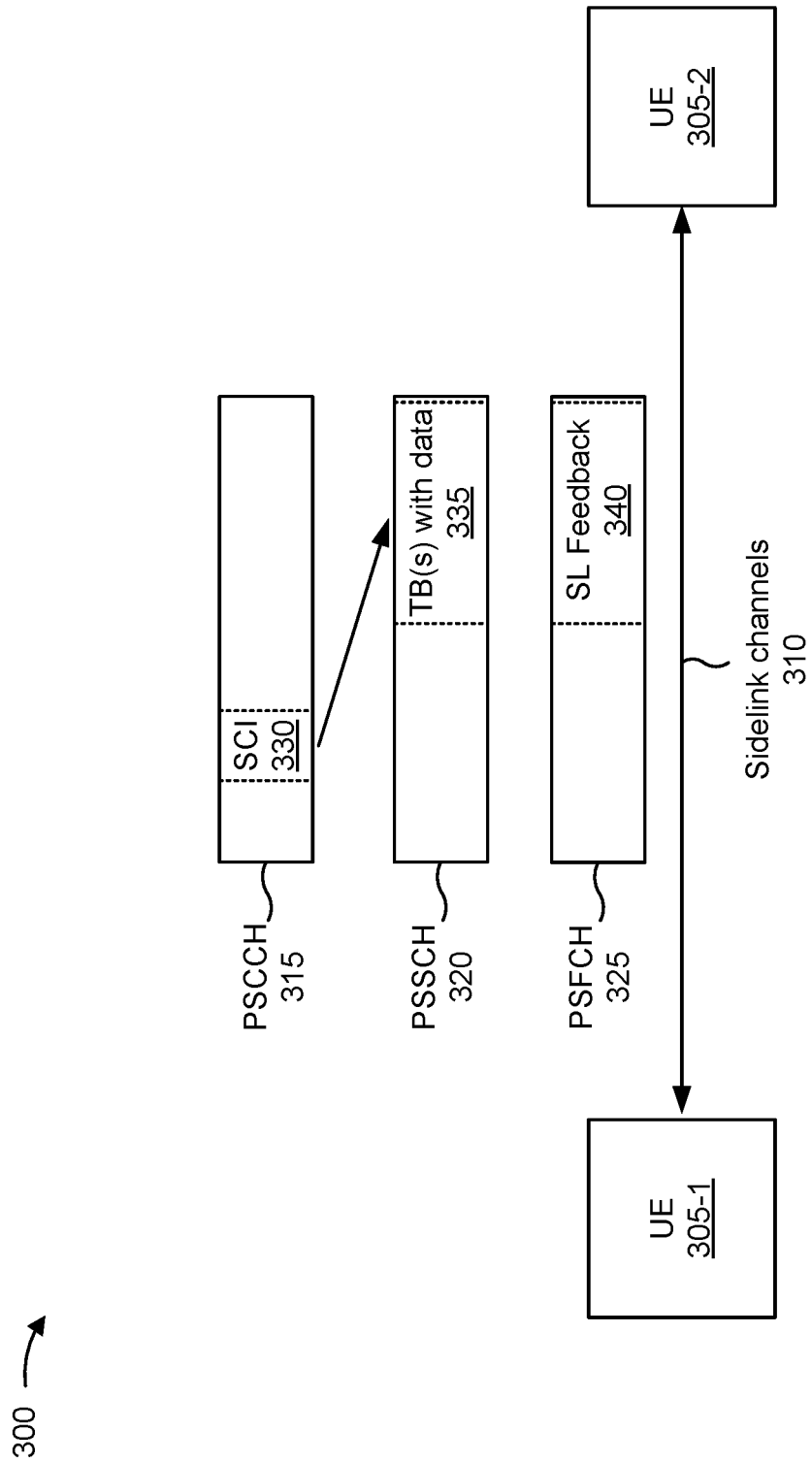
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

In some aspects, may include multiple sidelink channels associated with different frequency bands. For example, a first sidelink channel between the UE 305-1 and the UE 305-2 may correspond to a low frequency band sidelink channel (e.g., under 6 GHz) and a second sidelink channel between the UE 305-1 and the UE 305-2 may correspond to a high frequency band sidelink channel (e.g., above 6 GHz). The use of different frequency bands may enable the UEs to change between using frequency bands based at least in part on reliability and/or data throughput. For example, the first sidelink channel in the low frequency band may provide more reliability relative to the second sidelink channel based at least in part on a low frequency band transmission being less susceptible to line-of-sight (LoS) obstructions relative to a high frequency band transmission. The second sidelink channel in the high frequency band may provide higher data throughput relative to the first sidelink channel. In some aspects, the UE 305-1 and the UE 305-2 may switch between using the first sidelink channel and the second sidelink channel, such as by using the first sidelink channel to transmit control information with higher reliability (e.g., less susceptible to LoS obstructions) and by using the second sidelink channel to transmit user data with higher data throughput.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
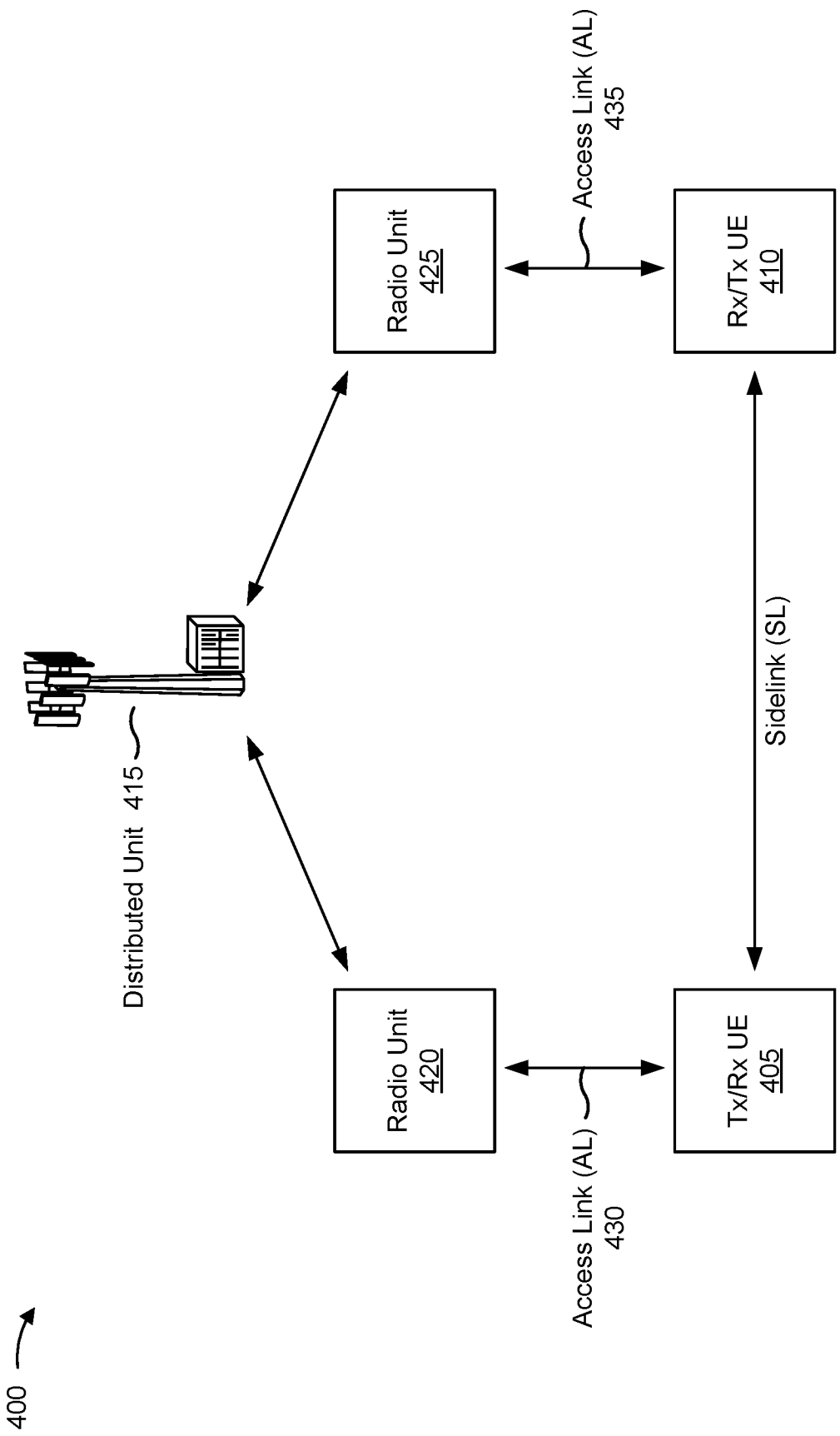
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As one example, the Tx/RX UE 405 may be a source UE that is an end device for communications (e.g., a source of a communication and/or an intended recipient of the communication) and the Rx/TX UE 410 may be a relay UE (e.g., that relays information to and/or from the source UE).

As further shown, in some sidelink modes, a network entity (e.g., a base station 110 or apparatus 900) may include a distributed unit 415 that communicates with a first radio unit 420 and a second radio unit 425. The first radio unit 420 may communicate with the Tx/Rx UE 405 via a first access link 430. Additionally, or alternatively, in some sidelink modes, the second radio unit 425 may communicate with the Rx/Tx UE 410 via a second access link 435. In some aspects, the first access link 430 and/or the second access link 435 may each be a Uu interface (e.g., an air interface that links a device to an access network). The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink and/or sidelink channel. A direct link between a radio unit (e.g., the first radio unit 420 and/or the second radio unit 425) and a UE 120, or a direct link between another network entity (e.g., the base station 110) and a UE 120, may be referred to as an access link. Sidelink communications may be transmitted via the sidelink channel, and access link communications may be transmitted via the access link. An access link communication may be either a downlink communication (from a base station 110 or radio unit 420/425 to a UE 120) or an uplink communication (from a UE 120 to a base station 110 or radio unit 420/425).

The term beamforming may denote a technique that generates a wireless signal that radiates in a particular direction. To illustrate, an omnidirectional signal may radiate in all directions while a beam may radiate in one particular direction. As one example, beamforming may use multiple antenna to transmit a signal using antenna configurations that cause constructive and/or destructive interference in a manner that generate a signal that propagates in the particular direction (e.g., a beam). Beamforming may also increase a strength and/or power of the signal (e.g., relative to an omnidirectional signal), which enables devices to transmit and recover information using higher frequencies over farther distances relative to omnidirectional signals.

In some aspects, a network entity may configure UEs to communicate with one another using a sidelink channel and based at least in part on beam transmissions (sometimes called beamformed transmissions). For example, the network entity may select a sidelink beam and/or a sidelink beam pair for the Tx/Rx UE 405 and/or the Rx/Tx UE 410 to use for sidelink communications (e.g., when the UEs are configured to communicate using a Mode 1 transmission mode). However, various factors may reduce a signal quality of the sidelink beam and/or sidelink beam pair, such as a UE moving to a new location, atmospheric changes, and/or changes in interference. The reduced signal quality may result in increased recovery errors, reduced data throughput, and/or increased data transfer latencies. In some aspects, the reduced signal quality of a beam transmission may be referred to as a beam failure (e.g., a signal quality of the beam fails to satisfy a quality threshold) that disrupts and/or terminates wireless communications.

Some techniques and apparatuses described herein provide sidelink beam management. In some aspects, a first UE communicates with a second UE using a sidelink channel and using a first beam. As one example, the first UE and the second UE may communicate using the sidelink channel and based at least in part on using a Mode 1 transmission mode in which a network entity schedules and/or grants resources. Alternatively or additionally, the network entity may indicate to use the first beam. At times, the first UE may be a relay UE or a source UE. In some aspects, the first UE may transmit a sidelink beam report to a network entity (e.g., a network entity associated with scheduling and/or granting resources for Mode 1 sidelink communications). The sidelink beam report may be based at least in part on the first beam. The first UE may receive sidelink configuration information from the network entity that indicates to change from using the sidelink channel and the first beam to using the sidelink channel and based at least in part on a second beam. Accordingly, the first UE may communicate with the second UE using the sidelink channel and based at least in part on the second beam.

In some aspects, a network entity may transmit sidelink configuration information to a first UE and/or a second UE. The sidelink configuration information may indicate to communicate over a sidelink channel between the first UE and the second UE using a first beam. However, the sidelink configuration information may indicate alternative or additional information as further described below. In some aspects, the network entity may receive a sidelink beam report associated with the sidelink channel and/or the first beam. Based at least in part on receiving the sidelink beam report, the network entity may transmit updated sidelink configuration information to the first UE and/or the second UE. As one example, the updated sidelink configuration information may indicate to communicate using the sidelink channel and based at least in part on changing from the first beam to a second beam.

By communicating a sidelink beam report to a network entity, a UE may provide the network entity with updates on sidelink conditions. For example, the sidelink beam report may include sidelink beam measurements and/or beam failure warnings that indicate signal quality associated with a beam used for sidelink communications is decreasing and/or trending towards beam failure. In some aspects, the sidelink beam report may indicate a preferred beam selected by the UE for sidelink communication. Based at least in part on the UE operating in the Mode 1 transmission mode for sidelink communications, the network entity may select a different beam for the sidelink that mitigates the decreasing signal quality and/or mitigates beam failure. Mitigating decreased signal quality and/or beam failure in the sidelink channel may reduce recovery errors, increase data throughput, and/or decrease data transfer latencies. In some aspects, mitigating beam failure may prevent the disruption and/or termination of wireless communications that use the sidelink channel.

As indicated above, FIG. 4 is provided as an example. Other examples may differ from what is described with respect to FIG. 4.

Figure 5:
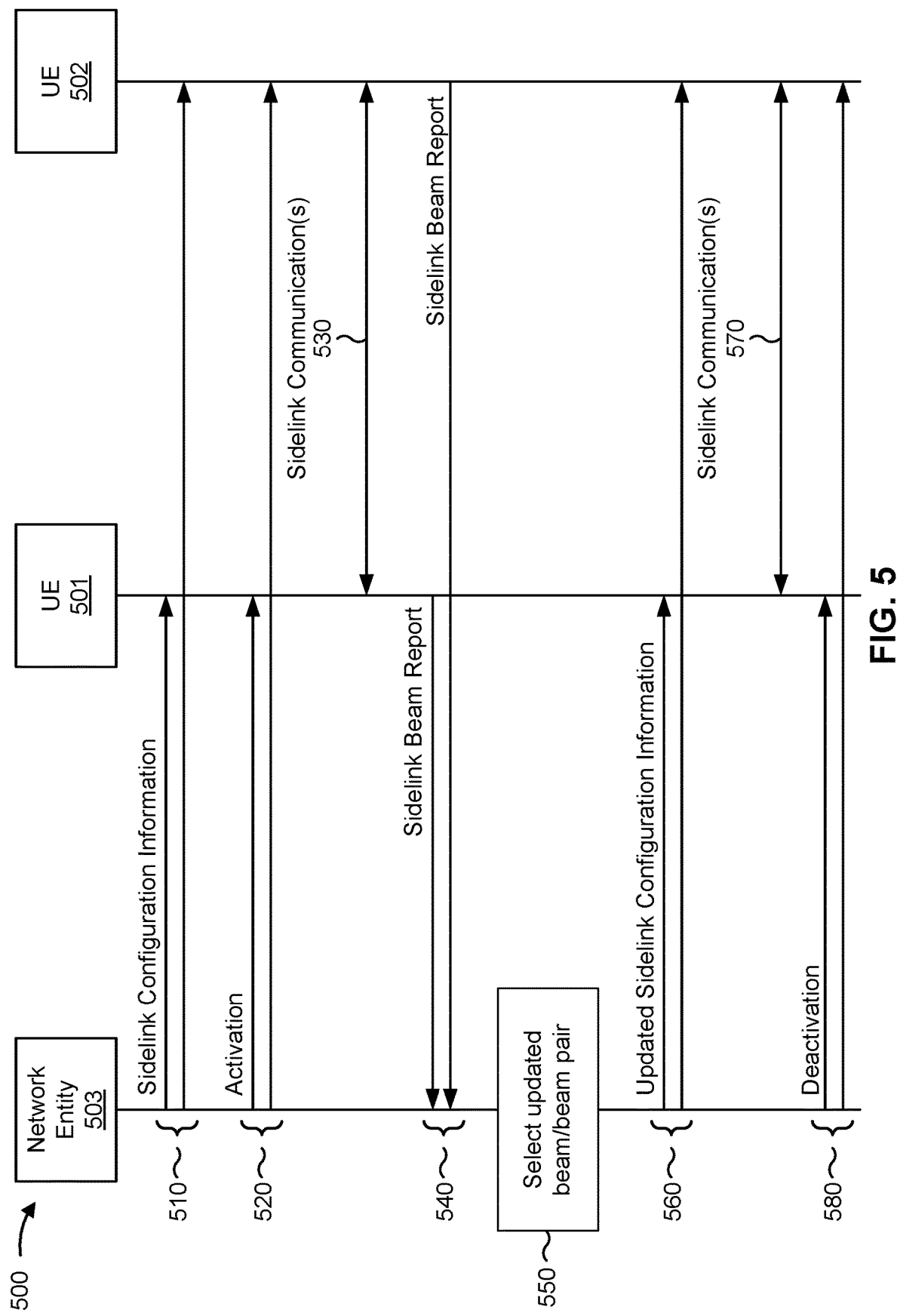
FIG. 5 is a diagram illustrating an example of a wireless communication process between a first UE, a second UE, and a network entity, in accordance with the present disclosure.

FIG. 5 is a diagram illustrating an example 500 of a wireless communication process between a first UE 501 (e.g., a UE 120 or an apparatus 800), a second UE 502 (e.g., another UE 120 or another apparatus 800), and a network entity 503 (e.g., the base station 110, the radio unit 420, the radio unit 425, or the apparatus 900), in accordance with the present disclosure. In some aspects, the UE 501 may be configured as a source UE, and the UE 502 may be configured as a relay UE.

As shown by reference number 510, the network entity 503 may transmit, and the UE 501 and/or the UE 502 may receive, sidelink configuration information. To illustrate, the network entity may transmit the sidelink configuration information using any combination of a radio resource control (RRC) message (e.g., an RRC configuration message), downlink control information (DCI), and/or a medium access control (MAC) control element (CE). The sidelink configuration information may indicate and/or include configuration information associated with sidelink communications between the UE 501 and the UE 502. As one example, the sidelink configuration information may indicate any combination of a beam identifier (ID) associated with a sidelink beam to be used for communication between two UEs, sidelink grant information, a sidelink beam sweeping configuration, and/or a sidelink beam report configuration. While the example 500 shows the network entity 503 transmitting the sidelink configuration information using a single transmission, other examples may include the network entity 503 transmitting the sidelink configuration information using multiple transmissions, multiple messages, and/or multiple indications. Further, while the example 500 shows the network entity 503 transmitting the sidelink configuration information to both the UE 501 and the UE 502, other examples may include the network entity 503 transmitting the sidelink configuration information to a relay UE (e.g., the UE 502) using an access link, and the relay UE transmitting the sidelink configuration information to a source UE (e.g., the UE 501) using a sidelink channel (e.g., using a low frequency band sidelink channel and/or a high frequency band sidelink channel).

The beam ID may identify a particular beam to use for a sidelink communication between the UE 501 and the UE 502. As one example, a beam ID may be associated with a propagation direction and/or angle. The sidelink grant information may indicate one or more resources (e.g., a frequency partition and/or a time partition) granted for and/or assigned to sidelink communication between the UE 501 and the UE 502.

A sidelink beam sweeping configuration may indicate a set of sidelink beams to include in a beam sweeping procedure and/or a schedule (e.g., time durations for switching beams). To illustrate, a beam sweeping procedure may denote a procedure in which a first device transmits a reference signal (e.g., CSI-RS) using one or more transmit beams and based at least in part on a schedule. Alternatively or additionally, the beam sweeping procedure may include a second device receiving and/or measuring the reference signal based at least in part on the schedule. As one example, the schedule may indicate a first time duration for transmitting the reference signal on a first beam, a second time duration for transmitting the reference signal on a second beam, and/or a third time duration for transmitting the reference signal on a third beam. In some aspects, the UE may select a preferred beam based at least in part on the beam sweeping procedure, such as a beam with a highest RSRP relative to other beams.

A sidelink beam report configuration may indicate content to include in a sidelink beam report. To illustrate, the sidelink beam report configuration may indicate to include, in the sidelink beam report, one or more sidelink beam measurements, a beam failure indicator ratio, a number of consecutive beam failure indicators, one or more sidelink condition measurements, a sidelink beam failure detection status, and/or a preferred beam. Alternatively or additionally, the sidelink beam report configuration may indicate to transmit the sidelink beam report periodically or aperiodically.

A sidelink beam measurement may be a metric that is generated based at least in part on a beam, such as a signal-to-noise ratio (SNR), a signal-to-interference-plus-noise ratio (SINR), RSRP, RSSI, and/or RSRQ. A beam failure indicator may indicate whether an instance of beam failure has been detected. A beam failure indicator ratio may indicate a ratio of detected beam failure instances to a maximum count (maxCount) threshold. In some aspects, the maximum count threshold denotes a number of detected beam failure instances that define a beam failure. To illustrate, a UE (e.g., the UE 501 and/or the UE 502) may repeatedly generate a sidelink beam measurement (e.g., a first measurement at a first point in time, a second measurement at a second point in time, up to N integer measurements or until receiving an indication to stop). The UE may analyze each instance of the sidelink measurement to determine if a beam failure has occurred and generate a beam failure indicator for each instance. As one example, the UE may generate, for each occasion of a beam failure detection (BFD)-reference signal (BFD-RS), a block error rate (BLER) estimation. In some aspects, the UE may set a beam failure indicator associated with the occasion to true if the BLER estimation satisfies a failure threshold. A beam failure indicator ratio may be a ratio based at least in part on a current number of beam failure indicators and the maximum count threshold.

In some aspects, the current number of beam failure indicators may be based at least in part on a time duration, such as a time duration associated with a timer. To illustrate, the UE may set a first beam failure indicator to true based at least in part on a BLER estimation, associated with a first BFD-RS occasion, satisfying the failure threshold. In some aspects, the UE may start a timer, such as a BFD timer, and begin counting a number of beam failure indicators (e.g., the current number of beam failure indicators) that are set to true prior to the timer expiration. The UE may reset the timer and/or current number of beam failure indicators to a starting value (e.g., "0") if the current number fails to satisfy the maximum count threshold or set the beam failure status to true if the current number satisfies the maximum count threshold.

A number of consecutive beam failure indicators may indicate how many consecutive beam failures were detected over a time duration. In some aspects, the sidelink configuration information may indicate and/or specify the time duration. A sidelink channel condition measurement may indicate one or more characteristics about the sidelink transmission channel between two devices (e.g., the UE 501 and the UE 502). To illustrate, the sidelink channel condition measurement may be CSI.

In some aspects, a sidelink beam failure status may indicate whether a beam failure has been detected or undetected. Alternatively or additionally, the sidelink beam failure status may indicate a history and/or count of beam failure indicators over a time duration or a number of consecutive BFIs over the time duration. In some aspects, the sidelink beam failure status may indicate a beam failure warning (e.g., that a beam failure has not been detected but signal conditions indicate a trend towards a beam failure). The sidelink beam failure status may be based at least in part on a single sidelink beam measurement, multiple sidelink beam measurements, a single beam failure indicator, and/or multiple beam failure indicators. As one example, a UE may set the sidelink beam failure status based at least in part on whether a current number of beam failure indicators satisfies the maximum count threshold (e.g., true when the current number satisfies the maximum count threshold and false when the current number fails to satisfy the maximum count threshold). A beam failure warning may be detected based at least in part on any combination of conditions, such as when the current number of the beam failure indicators satisfies a warning count threshold, a number of consecutive beam failure indicators satisfies a consecutive count threshold, and/or a signal strength decreases by a strength threshold within a particular time duration (e.g., a time duration defined to indicate a sudden drop in signal strength).

A preferred beam may denote a UE-selected beam. To illustrate, a UE (e.g., the UE 501 and/or the UE 502) may select a preferred beam based at least in part on a beam sweeping procedure (e.g., using beams associated with sidelink communications) as further described.

In some aspects, the sidelink beam report configuration may indicate to transmit the sidelink beam report periodically and may specify a periodicity for generating and/or transmitting the sidelink beam report. Alternatively, the sidelink beam report configuration may indicate to generate and/or transmit the sidelink beam report aperiodically. In some aspects, the sidelink beam report configuration may indicate one or more trigger events that indicate when to generate and/or transmit the sidelink beam report, such as a first trigger event associated with detecting a beam failure or a second trigger event associated with detecting a beam failure warning.

As shown by reference number 520, the network entity 503 may transmit, and the UE 501 and/or the UE 502 may receive, an activation indication that instructs the UE(s) to activate sidelink beam reporting. While the example 500 shows the network entity 503 transmitting the activation indication, other examples may include the UE 501 and/or the 502 transmitting a request to activate sidelink beam reporting as further described. In some aspects, the network entity 503 may transmit the indication in DCI or in an access link MAC CE. Communicating the sidelink configuration information separate from the activation indication enables the network entity to transmit the sidelink configuration information during time durations that may be less sensitive to data-transfer delays and quickly transmit the activation indication during time durations that may be more sensitive to data-transfer delays. While the example 500 shows the network entity 503 transmitting the activation indication to both the UE 501 and the UE 502, other examples may include the network entity 503 transmitting the activation indication to a relay UE (e.g., the UE 502) using an access link, and the relay UE transmitting the activation indication to a source UE (e.g., the UE 501) based at least in part on a sidelink channel (e.g., using a low frequency band sidelink channel or a high frequency band sidelink channel).

Further, while the example 500 shows the network entity 503 transmitting the sidelink configuration information separately from the activation indication, other examples may include the network entity 503 transmitting the sidelink configuration information in a same communication as the activation indication. As one example, the network entity 503 may implicitly indicate to activate sidelink beam reporting (e.g., the activation indication) based at least in part on transmitting the sidelink configuration information.

In some aspects, the network entity 503 may determine to transmit the activation indication based at least in part on various factors associated with the UE 501 and/or the UE 502, such as a QoS requirement associated with a source UE or a discontinuous reception (DRX) configuration associated with the UE 501 and/or the UE 502. For example, the network entity 503 may determine to transmit the activation indication based at least in part on identifying a QoS requirement for low data-transfer latencies and/or high data throughput that indicates a need to mitigate beam failure. Alternatively or additionally, the network entity 503 may determine to transmit the activation indication based at least in part on an active and/or awake DRX cycle of the UE.

In some aspects, the UE 501 and/or the UE 502 may transmit, and the network entity 503 may receive, a request to activate sidelink beam reporting. To illustrate, the UE 501 and/or the UE 502 may generate sidelink beam measurements based at least in part on one or more sidelink communications, as shown by reference number 530. The UE 501 and/or the UE 502 may analyze the sidelink beam measurements and determine that a signal quality is decreasing and/or trending towards a beam failure threshold. Based at least in part on determining that the signal quality is decreasing, the UE 501 and/or the UE 502 may transmit the request to activate the sidelink beam reporting. As other examples, the UE 501 and/or the UE 502 may transmit the request to activate the sidelink beam reporting based at least in part on any combination of a QoS requirement, a power capability associated with the UE, and a DRX configuration associated with the UE. For instance, the UE 501 and/or the UE 502 may transmit the request based at least in part on identifying that the power capabilities of the UE may tolerate power consumption associated with generating and/or transmitting the sidelink beam report. Alternatively or additionally, the UE 501 and/or the UE 502 may transmit the request during an active and/or awake DRX cycle. In some aspects, the network entity 503 may transmit the activation indication based at least in part on receiving the request to activate sidelink beam reporting.

As shown by reference number 530, the UE 501 may transmit and/or receive, and the UE 502 may receive and/or transmit, a sidelink communication based at least in part on the sidelink configuration information. To illustrate, the UE 501 and the UE 502 may communicate with one another using a sidelink channel and based at least in part on a beam and/or a sidelink grant indicated by the sidelink configuration information.

As shown by reference number 540, the UE 501 and/or the UE 502 may transmit, and the network entity 503 may receive, a sidelink beam report. To illustrate, the UE 501 and/or the UE 502 may transmit the sidelink beam report using an access link (e.g., uplink) MAC CE or access link uplink control information (UCI). In some aspects, the UE 501 and/or the UE 502 may transmit the sidelink beam report based at least in part on the sidelink report configuration. To illustrate, the UE 501 and/or the UE 502 may transmit the sidelink beam report as one of multiple sidelink beam reports based at least in part on a periodicity indicated by the sidelink report configuration. Alternatively, the UE 501 and/or the UE 502 may transmit the sidelink beam report aperiodically and/or based at least in part on detecting a trigger event. As further described above, the sidelink configuration information may indicate the trigger events for transmitting an aperiodic sidelink beam report.

In some aspects, the UE 501 and/or the UE 502 may iteratively transmit M periodic or aperiodic sidelink beam reports, where M is an integer number. The sidelink configuration information may indicate to transmit M sidelink beam reports and/or to cease transmitting sidelink beam reports after transmitting the M sidelink beam reports. Alternatively, the UE 501 and/or the UE 502 may iteratively transmit periodic or aperiodic sidelink beam reports until receiving a deactivation indication as further described below. While the example 500 shows the UE 501 and the UE 502 both transmitting sidelink beam reports, other examples may include a single UE transmitting a sidelink beam report, such as only the UE 501, only the UE 502, and/or a relay UE transmitting a sidelink beam report on behalf of a source UE. As one example, the network entity 503 may configure a single UE to transmit a sidelink beam report using the sidelink configuration information. As another example, only one UE of the UE 501 and the UE 502 may detect a trigger event associated with transmitting the sidelink beam report.

As shown by reference number 550, the network entity 503 may select a sidelink beam and/or sidelink beam pair. In some aspects, the network entity 503 may select the sidelink beam and/or sidelink beam pair based at least in part on a preferred beam indicated in a sidelink beam report. Alternatively or additionally, the network entity 503 may select the sidelink beam and/or sidelink beam pair based at least in part on multiple sidelink beam reports. To illustrate, the network entity 503 may analyze multiple sidelink beam measurements from multiple sidelink beam reports, identify that a signal quality associated with a sidelink beam is decreasing, and trigger selection of a new sidelink beam.

In some aspects, a sidelink beam report may include multiple sidelink beam measurements based at least in part on a set of sidelink beams. For example, the sidelink configuration information may indicate a set of sidelink beams, such as a first sidelink beam for sidelink communications and additional sidelink beams that are different from the first sidelink beam (e.g., have different transmission directions). The sidelink configuration information may also indicate to generate a sidelink beam measurement for each sidelink beam in the set of sidelink beams such that a sidelink beam report received by the network entity 503 includes multiple sidelink beam measurements. The network entity may analyze the multiple sidelink beam measurements and select the sidelink beam and/or sidelink beam pair based at least in part on the multiple sidelink beam measurements. For instance, the network entity 503 may select a sidelink beam and/or sidelink beam pair that has better signal quality (e.g., indicated by the sidelink beam measurement) relative to other sidelink beams.

As shown by reference number 560, the network entity 503 may transmit, and the UE 501 and/or UE 502 may receive, updated sidelink configuration information. The updated sidelink configuration information may indicate an updated or new sidelink beam and/or sidelink beam pair selected with regard to reference number 550. Alternatively or additionally, the updated sidelink configuration information may indicate updates to the sidelink reporting configuration, updates to a sidelink beam sweeping configuration, and/or updates to sidelink grant information. As one example, the sidelink configuration information as shown by reference number 510 may indicate a first sidelink reporting configuration, and the updated sidelink configuration information may indicate a second sidelink reporting configuration that is different from the first sidelink reporting configuration. In some aspects, the network entity 503 may update the sidelink reporting configuration based at least in part on optimizing the sidelink report for a particular UE, such as reducing a time duration of a reporting periodicity for a first UE moving at a fast velocity (e.g., moving at a rate that changes sidelink channel conditions) and/or changing sidelink beam reporting from periodic to aperiodic for a second UE with a low battery power level. Updating the sidelink configuration information may include excluding some information that was transmitted in prior sidelink configuration information and/or including new information that was not transmitted in the prior sidelink configuration information.

In aspects, the network entity 503 may transmit the updated sidelink configuration information using an RRC message (e.g., an RRC configuration message). Transmitting the updated sidelink configuration information using the RRC message may enable the network entity 503 to explicitly update and/or change each parameter of the sidelink configuration information. Alternatively or additionally, the network entity may transmit updated parameters of the (initial) sidelink configuration as described with regard to reference number 510 using a MAC CE or DCI. Transmitting updated parameters using a MAC CE or DCI may enable the network entity 503 to quickly make incremental changes to some parameters of the (initial) sidelink configuration information used by the UE 501 and/or the UE 502. The network entity 503 may implicitly direct the UE 501 and/or the UE 502 to reuse existing values for some parameters by refraining to transmit updates to these parameters, which may reduce an amount of information transmitted over the air interface. While the example 500 shows the network entity 503 transmitting the updated sidelink configuration information to both the UE 501 and the UE 502, other examples may include the network entity 503 transmitting the updated sidelink configuration information to a relay UE (e.g., the UE 502) using an access link, and the relay UE transmitting the updated sidelink configuration information to a source UE (e.g., the UE 501) using a sidelink channel (e.g., using a low frequency band sidelink channel or a high frequency band sidelink channel).

As shown by reference number 570, the UE 501 may transmit and/or receive, and the UE 502 may receive and/or transmit, a sidelink communication based at least in part on the updated sidelink configuration information. To illustrate, the UE 501 and the UE 502 may communicate with one another using a sidelink channel and using an updated sidelink beam and/or an updated sidelink grant indicated by the updated sidelink configuration information.

As shown by reference number 580, the network entity 503 may transmit, and the UE 501 and/or the UE 502 may receive, a deactivation indication that instructs the UE 501 and/or the UE 502 to deactivate sidelink beam reporting. Similar to that described with regard to reference number 520, the network entity 503 may transmit the deactivation indication using a MAC CE or DCI. While the example 500 shows the network entity 503 transmitting the deactivation indication to both the UE 501 and the UE 502, other examples may include the network entity 503 transmitting the deactivation indication to a relay UE (e.g., the UE 502) using an access link, and the relay UE transmitting the sidelink configuration information to a source UE (e.g., the UE 501) using a sidelink channel. Alternatively or additionally, the UE 501 and/or the UE 502 may transmit, and the network entity 503 may receive, a deactivation request associated with deactivating sidelink beam reporting. In some aspects, the network entity 503 may transmit the deactivation indication based at least in part on receiving the deactivation request from the UE 501 and/or the UE 502.

By communicating a sidelink beam report to a network entity, a UE may provide the network entity with updates on sidelink conditions. For example, the sidelink beam report may include sidelink beam measurements and/or beam failure warnings that indicate signal quality associated with a beam used for sidelink communications is decreasing and/or trending towards beam failure. Based at least in part on the UE operating in the Mode 1 transmission mode for sidelink communications, the network entity may select a different sidelink beam for the sidelink that mitigates the decreasing signal quality and/or mitigates beam failure. Mitigating decreased signal quality and/or beam failure in the sidelink channel may reduce recovery errors, increase data throughput, and/or decrease data transfer latencies. In some aspects, mitigating beam failure may prevent the disruption and/or termination of wireless communications that use the sidelink channel.

As indicated above, FIG. 5 is provided as an example. Other examples may differ from what is described with respect to FIG. 5.

Figure 6:
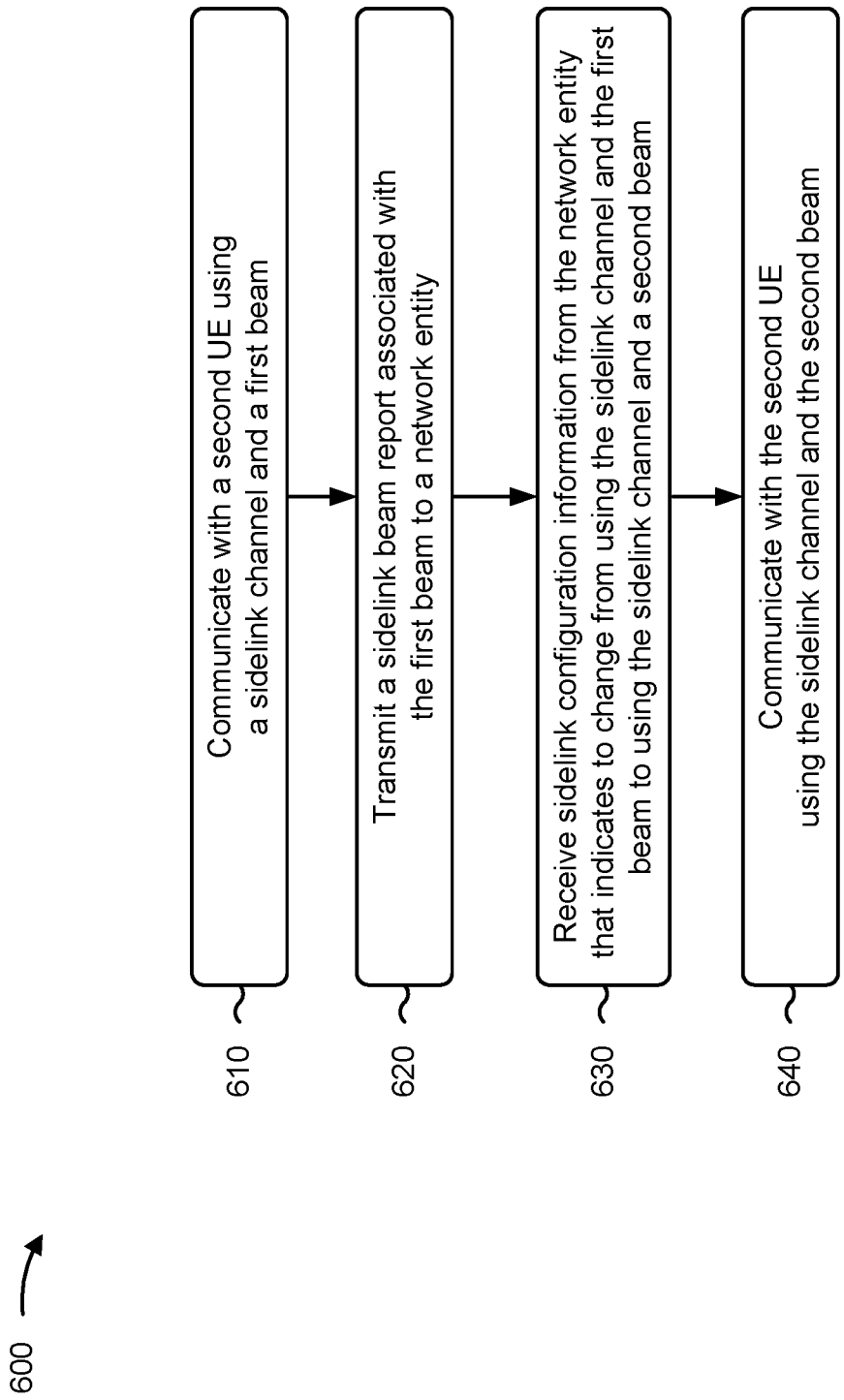
FIG. 6 is a diagram illustrating an example process performed, for example, by a first UE, in accordance with the present disclosure.

FIG. 6 is a diagram illustrating an example process 600 performed, for example, by a first user equipment (UE), in accordance with the present disclosure. Example process 600 is an example where the UE (e.g., UE 120 or an apparatus 800) performs operations associated with sidelink beam management.

As shown in FIG. 6, in some aspects, process 600 may include communicating with a second UE using a sidelink channel and a first beam (block 610). For example, the UE (e.g., using communication manager 140 and/or sidelink beam manager component 808, depicted in FIG. 8) may communicate with a second UE using a sidelink channel and a first beam, as described above.

As further shown in FIG. 6, in some aspects, process 600 may include transmitting a sidelink beam report associated with the first beam to a network entity (block 620). For example, the UE (e.g., using communication manager 140 and/or transmission component 804, depicted in FIG. 8) may transmit a sidelink beam report associated with the first beam to a network entity, as described above.

As further shown in FIG. 6, in some aspects, process 600 may include receiving sidelink configuration information from the network entity that indicates to change from using the sidelink channel and the first beam to using the sidelink channel and a second beam (block 630). For example, the UE (e.g., using communication manager 140 and/or reception component 802, depicted in FIG. 8) may receive sidelink configuration information from the network entity that indicates to change from using the sidelink channel and the first beam to using the sidelink channel and a second beam, as described above.

As further shown in FIG. 6, in some aspects, process 600 may include communicating with the second UE using the sidelink channel and the second beam (block 640). For example, the UE (e.g., using communication manager 140 and/or sidelink beam manager component 808, depicted in FIG. 8) may communicate with the second UE using the sidelink channel and the second beam, as described above. By communicating a sidelink beam report to a network entity, a UE operating in a Mode 1 transmission may provide the network entity with updates on sidelink channel conditions, and receive updated sidelink configuration information that indicates to change to a different sidelink beam that mitigates the decreasing signal quality and/or mitigates beam failure. Mitigating decreased signal quality and/or beam failure in the sidelink channel may reduce recovery errors, increase data throughput, and/or decrease data transfer latencies. In some aspects, mitigating beam failure may prevent the disruption and/or termination of wireless communications that use the sidelink channel.

Process 600 may include additional aspects, such as any single aspect or any combination of aspects described below and/or in connection with one or more other processes described elsewhere herein.

In a first aspect, receiving the instruction to change from the first beam to the second beam further comprises receiving the instruction prior to detecting a sidelink beam failure associated with the first beam.

In a second aspect, alone or in combination with the first aspect, transmitting the sidelink beam report further comprises transmitting the sidelink beam report periodically.

In a third aspect, alone or in combination with one or more of the first and second aspects, process 600 includes receiving, prior to communicating with the second UE using the sidelink channel, initial sidelink configuration information from the network entity, wherein the initial sidelink configuration information indicates at least one of a beam identifier (ID) associated with the first beam, a sidelink beam report configuration, sidelink grant information, or a sidelink beam sweeping configuration.

In a fourth aspect, alone or in combination with one or more of the first through third aspects, the sidelink beam report configuration indicates to configure the sidelink beam report as a periodic sidelink beam report, or an aperiodic sidelink beam report.

In a fifth aspect, alone or in combination with one or more of the first through fourth aspects, the sidelink beam report configuration indicates a periodicity associated with the periodic sidelink beam report.

In a sixth aspect, alone or in combination with one or more of the first through fifth aspects, the sidelink beam report configuration indicates content to include in the sidelink beam report.

In a seventh aspect, alone or in combination with one or more of the first through sixth aspects, the sidelink beam report configuration indicates, as the content to include in the sidelink beam report, at least one of a sidelink beam measurement, a beam failure indicator ratio, a number of consecutive beam failure indicators, one or more sidelink channel condition measurements, a sidelink beam failure detection status, or a preferred beam.

In an eighth aspect, alone or in combination with one or more of the first through seventh aspects, receiving the initial sidelink configuration information further comprises receiving the initial sidelink configuration information in a radio resource control message.

In a ninth aspect, alone or in combination with one or more of the first through eighth aspects, the initial sidelink configuration information indicates the sidelink beam report configuration, wherein the sidelink beam report configuration is a first sidelink beam report configuration, and the method further comprises receiving an indication to switch from the first sidelink beam report configuration to a second sidelink beam report configuration.

In a tenth aspect, alone or in combination with one or more of the first through ninth aspects, receiving the indication to switch further comprises receiving the indication in an access link MAC CE, or receiving the indication in downlink control information.

In an eleventh aspect, alone or in combination with one or more of the first through tenth aspects, the sidelink beam report indicates at least one of a sidelink beam measurement, a beam failure indicator ratio, a number of consecutive beam failure indicator, one or more sidelink channel condition measurements, a sidelink beam failure detection status, or a preferred beam.

In a twelfth aspect, alone or in combination with one or more of the first through eleventh aspects, transmitting the sidelink beam report further comprises transmitting the sidelink beam report to the network entity in an access link medium access control MAC CE.

In a thirteenth aspect, alone or in combination with one or more of the first through twelfth aspects, transmitting the sidelink beam report further comprises transmitting the sidelink beam report to the network entity in uplink control information.

In a fourteenth aspect, alone or in combination with one or more of the first through thirteenth aspects, transmitting the sidelink beam report further comprises transmitting the sidelink beam report aperiodically.

In a fifteenth aspect, alone or in combination with one or more of the first through fourteenth aspects, transmitting the sidelink beam report aperiodically further comprises transmitting the sidelink beam report based at least in part on detecting a trigger event, the trigger event comprising detecting a beam failure, or detecting a beam failure warning.

In a sixteenth aspect, alone or in combination with one or more of the first through fifteenth aspects, detecting the beam failure warning further comprises at least one of detecting that a current number of beam failure indicators satisfies a warning count threshold, detecting that a number of consecutive beam failure indicators satisfies a consecutive count threshold, or detecting a signal strength decreases by a strength threshold value within a particular time duration.

In a seventeenth aspect, alone or in combination with one or more of the first through sixteenth aspects, process 600 includes at least one of receiving a first indication to activate sidelink beam reporting, or receiving a second indication to deactivate the sidelink beam reporting.

In an eighteenth aspect, alone or in combination with one or more of the first through seventeenth aspects, receiving the first indication or receiving the second indication further comprises receiving the first indication or the second indication in an access link MAC CE, or receiving the first indication or the second indication in downlink control information. Receiving the first indication and/or the second indication in a MAC CE or DCI may enable the UE to quickly receive and activate sidelink beam reporting. Quickly enabling sidelink beam reporting may enable the UE to quickly communicate sidelink beam reports that indicate a sidelink beam may be trending towards beam failure and/or may receive updated sidelink configuration information that mitigates a beam failure.

In a nineteenth aspect, alone or in combination with one or more of the first through eighteenth aspects, process 600 includes transmitting, to the network entity, a request to activate sidelink beam reporting.

In a twentieth aspect, alone or in combination with one or more of the first through nineteenth aspects, transmitting the request further comprises transmitting the request in an access link MAC CE, or transmitting the request in uplink control information.

In a twenty-first aspect, alone or in combination with one or more of the first through twentieth aspects, transmitting the request to activate the sidelink beam reporting is based at least in part on at least one of a QoS requirement associated with the first UE, a power capability associated with the first UE, or a DRX configuration associated with the first UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
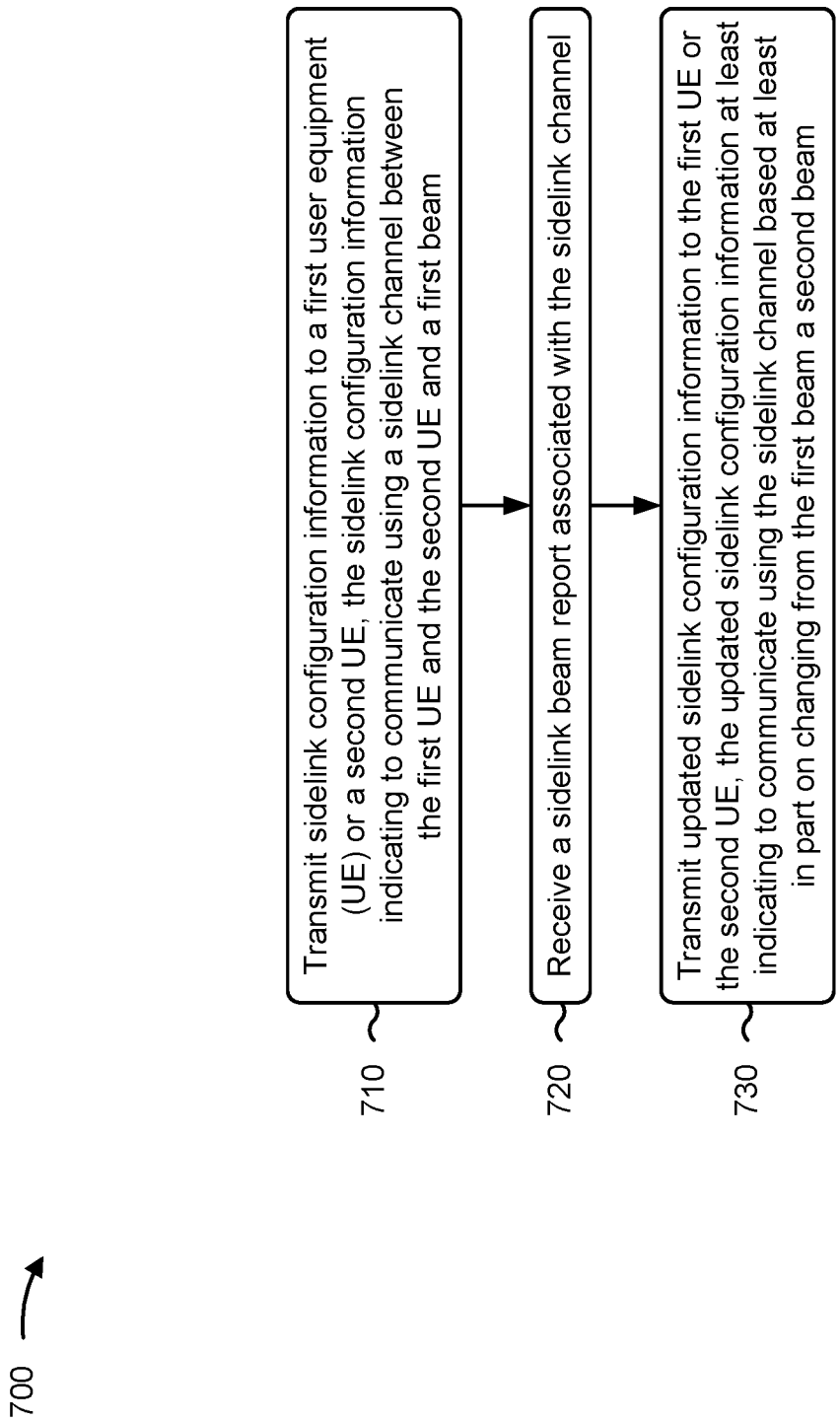
FIG. 7 is a diagram illustrating an example process performed, for example, by a network entity, in accordance with the present disclosure.

FIG. 7 is a diagram illustrating an example process 700 performed, for example, by a network entity, in accordance with the present disclosure. Example process 700 is an example where the network entity (e.g., the base station 110, network entity 503, or apparatus 900) performs operations associated with sidelink beam management.

As shown in FIG. 7, in some aspects, process 700 may include transmitting sidelink configuration information to a first UE or a second UE, the sidelink configuration information indicating to communicate using a sidelink channel between the first UE and the second UE and a first beam (block 710). For example, the network entity (e.g., using communication manager 150 and/or transmission component 904, depicted in FIG. 9) may transmit sidelink configuration information to a first user equipment (UE) or a second UE, the sidelink configuration information indicating to communicate using a sidelink channel between the first UE and the second UE and a first beam, as described above.

As further shown in FIG. 7, in some aspects, process 700 may include receiving a sidelink beam report associated with the sidelink channel (block 720). For example, the network entity (e.g., using communication manager 150 and/or reception component 902, depicted in FIG. 9) may receive a sidelink beam report associated with the sidelink channel, as described above.

As further shown in FIG. 7, in some aspects, process 700 may include transmitting updated sidelink configuration information to the first UE or the second UE, the updated sidelink configuration information at least indicating to communicate using the sidelink channel and based at least in part on changing from the first beam a second beam (block 730). For example, the network entity (e.g., using communication manager 150 and/or transmission component 904, depicted in FIG. 9) may transmit updated sidelink configuration information to the first UE or the second UE, the updated sidelink configuration information at least indicating to communicate using the sidelink channel and based at least in part on changing from the first beam a second beam, as described above. By receiving a sidelink beam report, a network entity selecting sidelink resources and/or configurations for a UE operating in a Mode 1 transmission may select a different sidelink beam that mitigates decreasing signal quality and/or mitigates beam failure identified based at least in part on the sidelink beam report. Mitigating decreased signal quality and/or beam failure in the sidelink channel may reduce recovery errors, increase data throughput, and/or decrease data transfer latencies. In some aspects, mitigating beam failure may prevent the disruption and/or termination of wireless communications that use the sidelink channel Process 700 may include additional aspects, such as any single aspect or any combination of aspects described below and/or in connection with one or more other processes described elsewhere herein.

In a first aspect, transmitting the updated sidelink configuration information further comprises transmitting the updated sidelink configuration information prior to receiving an indication of sidelink beam failure associated with the first beam.

In a second aspect, alone or in combination with the first aspect, receiving the sidelink beam report further comprises receiving the sidelink beam report periodically.

In a third aspect, alone or in combination with one or more of the first and second aspects, the sidelink configuration information indicates at least one of a beam ID associated with the first beam, a sidelink beam report configuration, sidelink grant information, or a sidelink beam sweeping configuration.

In a fourth aspect, alone or in combination with one or more of the first through third aspects, the sidelink beam report configuration indicates to configure the sidelink beam report as a periodic sidelink beam report, or an aperiodic sidelink beam report.

In a fifth aspect, alone or in combination with one or more of the first through fourth aspects, the sidelink beam report configuration indicates a periodicity associated with the periodic sidelink beam report. Configuring a periodicity of the sidelink beam report may reduce signaling overhead by reducing a number of messages for triggering a sidelink beam report. To illustrate a single message that indicates a periodicity may trigger multiple sidelink beam reports, which is reduced signaling relative to dedicated messages for each sidelink beam report that is triggered.

In a sixth aspect, alone or in combination with one or more of the first through fifth aspects, the sidelink beam report configuration indicates content to include in the sidelink beam report.

In a seventh aspect, alone or in combination with one or more of the first through sixth aspects, the sidelink beam report configuration indicates, as the content to include in the sidelink beam report, at least one of a sidelink beam measurement, a beam failure indicator ratio, a number of consecutive beam failure indicators, one or more sidelink channel condition measurements, a sidelink beam failure detection status, or a preferred beam.

In an eighth aspect, alone or in combination with one or more of the first through seventh aspects, the sidelink configuration information indicates the sidelink beam report configuration, wherein the sidelink beam report configuration is a first sidelink beam report configuration, and the method further comprises transmitting an indication to switch from the first sidelink beam report configuration to a second sidelink beam report configuration. Changing sidelink beam report configurations may enable a network entity to optimize what information is included in a sidelink beam report, which may reduce how many air interface resource are used to communicate the sidelink beam report and/or and configure the sidelink beam report to include current information that helps mitigate beam failure.

In a ninth aspect, alone or in combination with one or more of the first through eighth aspects, transmitting the indication to switch further comprises transmitting the indication in an access link MAC CE, or transmitting the indication in downlink control information.

In a tenth aspect, alone or in combination with one or more of the first through ninth aspects, transmitting the sidelink configuration information further comprises transmitting the sidelink configuration information in a radio resource control message.

In an eleventh aspect, alone or in combination with one or more of the first through tenth aspects, the sidelink beam report indicates at least one of a sidelink beam measurement, a beam failure indicator ratio, a number of consecutive beam failure indicator, one or more sidelink channel condition measurements, a sidelink beam failure detection status, or a preferred beam.

In a twelfth aspect, alone or in combination with one or more of the first through eleventh aspects, receiving the sidelink beam report further comprises receiving the sidelink beam report in an access link MAC CE.

In a thirteenth aspect, alone or in combination with one or more of the first through twelfth aspects, receiving the sidelink beam report further comprises receiving the sidelink beam report in uplink control information.

In a fourteenth aspect, alone or in combination with one or more of the first through thirteenth aspects, receiving the sidelink beam report further comprises receiving the sidelink beam report aperiodically.

In a fifteenth aspect, alone or in combination with one or more of the first through fourteenth aspects, process 700 includes at least one of transmitting a first indication to activate sidelink beam reporting, or transmitting a second indication to deactivate the sidelink beam reporting.

In a sixteenth aspect, alone or in combination with one or more of the first through fifteenth aspects, transmitting the first indication to activate the sidelink beam reporting is based at least in part on at least one of a QoS requirement associated with the first UE or the second UE, or a DRX configuration associated with the first UE or the second UE.

In a seventeenth aspect, alone or in combination with one or more of the first through sixteenth aspects, transmitting the first indication or transmitting the second indication further comprises transmitting the first indication or the second indication in an access link MAC CE, or transmitting the first indication or the second indication in downlink control information.

In an eighteenth aspect, alone or in combination with one or more of the first through seventeenth aspects, process 700 includes receiving a request to activate sidelink beam reporting.

In a nineteenth aspect, alone or in combination with one or more of the first through eighteenth aspects, receiving the request further comprises receiving the request in an access link MAC CE, or receiving the request in uplink control information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
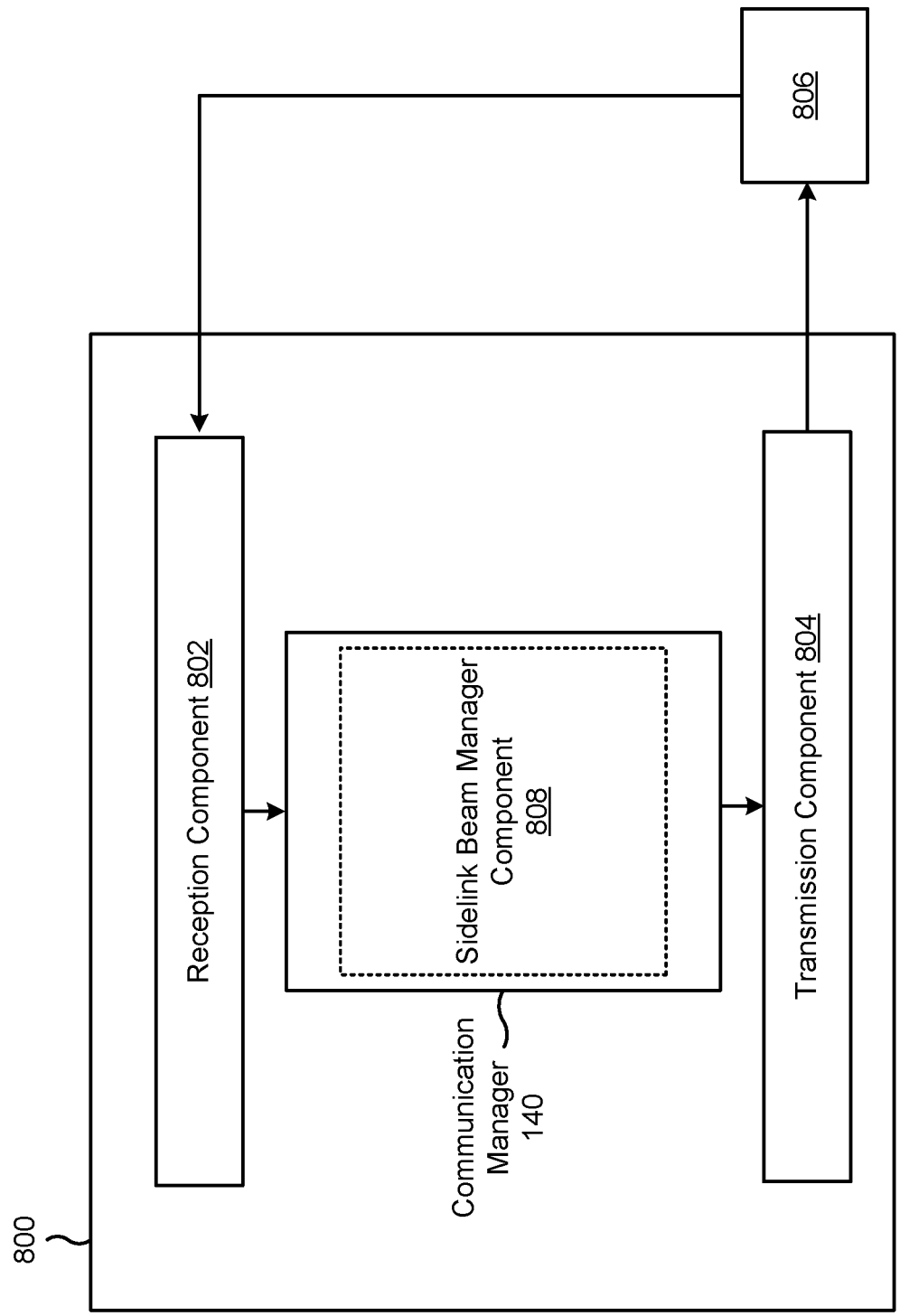
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a sidelink beam manager component 808, among other examples.

In some aspects, the apparatus 800 may be configured to perform one or more operations described herein in connection with FIGS. 3-7. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digitalto-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The sidelink beam manager component 808 may configure the apparatus 800 to communicate with a second UE using a sidelink channel and a first beam. The transmission component 804 may transmit a sidelink beam report associated with the first beam to a network entity. The reception component 802 may receive sidelink configuration information from the network entity that indicates to change from using the sidelink channel and the first beam to using the sidelink channel and a second beam. The sidelink beam manager component 808 may configure the apparatus 800 to communicate with the second UE using the sidelink channel and the second beam.

The sidelink beam manager component 808 may generate one or more sidelink beam reports based at least in part on sidelink configuration information. Alternatively or additionally, the sidelink beam manager component 808 may instruct the apparatus 800 to transmit the one or more sidelink beam reports to a network entity based at least in part on sidelink configuration information.

The reception component 802 may receive, prior to communicating with the second UE using the sidelink channel, initial sidelink configuration information from the network entity, wherein the initial sidelink configuration information indicates at least one of a beam ID associated with the first beam, a sidelink beam report configuration, sidelink grant information, or a sidelink beam sweeping configuration.

The transmission component 804 may transmit, to the network entity, a request to activate sidelink beam reporting.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
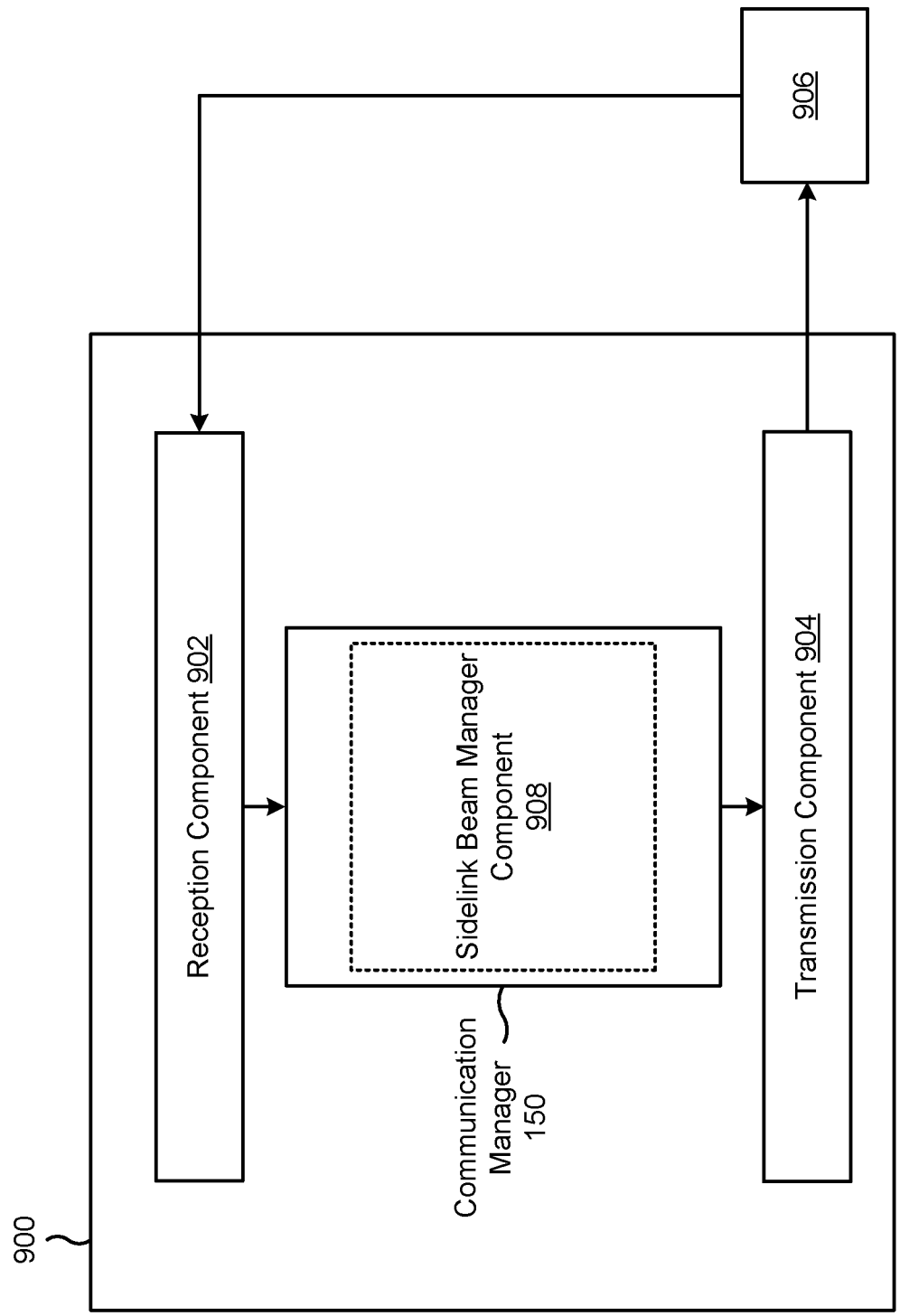
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150) may include one or more of a sidelink beam manager component 908, among other examples.

In some aspects, the apparatus 900 may be configured to perform one or more operations described herein in connection with FIGS. 1-7 Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network entity described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network entity described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described in connection with FIG. 2. In some aspects, the transmission component 904 may be co-located with the reception component 902 in a transceiver.

The sidelink beam manager component 908 may select sidelink configuration information associated with a sidelink channel between two UEs. In some aspects, the sidelink beam manager component 908 selects the sidelink configuration information based at least in part on the two UEs using Mode 1 transmission mode communications for the sidelink channel. The sidelink beam manager component 908 may analyze one or more sidelink beam reports and/or select updated sidelink configuration information based at least in part on a sidelink beam report.

The transmission component 904 may transmit sidelink configuration information to a first user equipment (UE) or a second UE, the sidelink configuration information indicating to communicate using a sidelink channel between the first UE and the second UE based at least in part on a first beam. The reception component 902 may receive a sidelink beam report associated with the sidelink channel. The transmission component 904 may transmit updated sidelink configuration information to the first UE or the second UE, the updated sidelink configuration information at least indicating to communicate using the sidelink channel based at least in part on changing from the first beam a second beam.

The reception component 902 may receive a request to activate sidelink beam reporting and/or forward the request to the sidelink beam manager component 908 for processing.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first user equipment (UE), comprising: communicating with a second UE using a sidelink channel and a first beam; transmitting a sidelink beam report associated with the first beam to a network entity; receiving sidelink configuration information from the network entity that indicates to change from using the sidelink channel and the first beam to using the sidelink channel and a second beam; and communicating with the second UE using the sidelink channel and the second beam.

Aspect 2: The method of Aspect 1, wherein receiving the instruction to change from the first beam to the second beam further comprises: receiving the instruction prior to detecting a sidelink beam failure associated with the first beam.

Aspect 3: The method of Aspect 1 or Aspect 2, wherein transmitting the sidelink beam report further comprises: transmitting the sidelink beam report periodically.

Aspect 4: The method of any one of Aspects 1-3, further comprising: receiving, prior to communicating with the second UE using the sidelink channel, initial sidelink configuration information from the network entity, wherein the initial sidelink configuration information indicates at least one of: a beam identifier (ID) associated with the first beam, a sidelink beam report configuration, sidelink grant information, or a sidelink beam sweeping configuration.

Aspect 5: The method of Aspect 4, wherein the sidelink beam report configuration indicates to configure the sidelink beam report as: a periodic sidelink beam report, or an aperiodic sidelink beam report.

Aspect 6: The method of Aspect 5, wherein the sidelink beam report configuration indicates a periodicity associated with the periodic sidelink beam report.

Aspect 7: The method of any one of Aspects 4-6, wherein the sidelink beam report configuration indicates content to include in the sidelink beam report.

Aspect 8: The method of Aspect 7, wherein the sidelink beam report configuration indicates, as the content to include in the sidelink beam report, at least one of: a sidelink beam measurement, a beam failure indicator ratio, a number of consecutive beam failure indicators, one or more sidelink channel condition measurements, a sidelink beam failure detection status, or a preferred beam.

Aspect 9: The method of any one of Aspects 4-8, wherein receiving the sidelink configuration information further comprises: receiving the sidelink configuration information in a radio resource control message.

Aspect 10: The method of any one of Aspects 4-8, wherein the sidelink configuration information indicates the sidelink beam report configuration, wherein the sidelink beam report configuration is a first sidelink beam report configuration, and the method further comprises: receiving an indication to switch from the first sidelink beam report configuration to a second sidelink beam report configuration.

Aspect 11: The method of Aspect 10, wherein receiving the indication to switch further comprises: receiving the indication in an access link medium access control (MAC) control element (CE); or receiving the indication in downlink control information.

Aspect 12: The method of any one of Aspects 1-11, wherein the sidelink beam report indicates at least one of: a sidelink beam measurement, a beam failure indicator ratio, a number of consecutive beam failure indicator, one or more sidelink channel condition measurements, a sidelink beam failure detection status, or a preferred beam.

Aspect 13: The method of any one of Aspects 1-12, wherein transmitting the sidelink beam report further comprises: transmitting the sidelink beam report to the network entity in an access link medium access control (MAC) control element (CE).

Aspect 14: The method of any one of Aspects 1-12, wherein transmitting the sidelink beam report further comprises: transmitting the sidelink beam report to the network entity in uplink control information.

Aspect 15: The method of any one of Aspects 1-14, wherein transmitting the sidelink beam report further comprises: transmitting the sidelink beam report aperiodically.

Aspect 16: The method of Aspect 15, wherein transmitting the sidelink beam report aperiodically further comprises: transmitting the sidelink beam report based at least in part on detecting a trigger event, the trigger event comprising: detecting a beam failure; or detecting a beam failure warning.

Aspect 17: The method of Aspect 16, wherein detecting the beam failure warning further comprises at least one of: detecting that a current number of beam failure indicators satisfies a warning count threshold; detecting that a number of consecutive beam failure indicators satisfies a consecutive count threshold; or detecting a signal strength decreases by a strength threshold value within a particular time duration.

Aspect 18: The method of any one of Aspects 1-17, further comprising at least one of: receiving a first indication to activate sidelink beam reporting; or receiving a second indication to deactivate the sidelink beam reporting.

Aspect 19: The method of Aspect 18, wherein receiving the first indication or receiving the second indication further comprises: receiving the first indication or the second indication in an access link medium access control (MAC) control element (CE); or receiving the first indication or the second indication in downlink control information.

Aspect 20: The method of any one of Aspects 1-20, further comprising: transmitting, to the network entity, a request to activate sidelink beam reporting.

Aspect 21: The method of Aspect 20, wherein transmitting the request further comprises: transmitting the request in an access link medium access control (MAC) control element (CE); or transmitting the request in uplink control information.

Aspect 22: The method of Aspect 20 or Aspect 21, wherein transmitting the request to activate the sidelink beam reporting is based at least in part on at least one of: a quality of service (QoS) requirement associated with the first UE, a power capability associated with the first UE, or a discontinuous reception (DRX) configuration associated with the first UE.

Aspect 23: A method of wireless communication performed by a network entity, comprising: transmitting sidelink configuration information to a first user equipment (UE) or a second UE, the sidelink configuration information indicating to communicate using a sidelink channel between the first UE and the second UE and a first beam; receiving a sidelink beam report associated with the sidelink channel; and transmitting updated sidelink configuration information to the first UE or the second UE, the updated sidelink configuration information at least indicating to communicate using the sidelink channel based at least in part on changing from the first beam a second beam.

Aspect 24: The method of Aspect 23, wherein transmitting the updated sidelink configuration information further comprises: transmitting the updated sidelink configuration information prior to receiving an indication of sidelink beam failure associated with the first beam.

Aspect 25: The method of Aspect 23 or Aspect 24, wherein receiving the sidelink beam report further comprises: receiving the sidelink beam report periodically.

Aspect 26: The method of any one of Aspects 23-25, wherein the sidelink configuration information indicates at least one of: a beam identifier (ID) associated with the first beam, a sidelink beam report configuration, sidelink grant information, or a sidelink beam sweeping configuration.

Aspect 27: The method of Aspect 26, wherein the sidelink beam report configuration indicates to configure the sidelink beam report as: a periodic sidelink beam report, or an aperiodic sidelink beam report.

Aspect 28: The method of Aspect 27, wherein the sidelink beam report configuration indicates a periodicity associated with the periodic sidelink beam report.

Aspect 29: The method of any one of Aspects 26-28, wherein the sidelink beam report configuration indicates content to include in the sidelink beam report.

Aspect 30: The method of Aspect 29, wherein the sidelink beam report configuration indicates, as the content to include in the sidelink beam report, at least one of: a sidelink beam measurement, a beam failure indicator ratio, a number of consecutive beam failure indicators, one or more sidelink channel condition measurements, a sidelink beam failure detection status, or a preferred beam.

Aspect 31: The method of any one of Aspects 26-30, wherein the sidelink configuration information indicates the sidelink beam report configuration, wherein the sidelink beam report configuration is a first sidelink beam report configuration, and the method further comprises: transmitting an indication to switch from the first sidelink beam report configuration to a second sidelink beam report configuration.

Aspect 32: The method of Aspect 31, wherein transmitting the indication to switch further comprises: transmitting the indication in an access link medium access control (MAC) control element (CE); or transmitting the indication in downlink control information.

Aspect 33: The method of any one of Aspects 23-33, wherein transmitting the sidelink configuration information further comprises: transmitting the sidelink configuration information in a radio resource control message.

Aspect 34: The method of any one of Aspects 23-33, wherein the sidelink beam report indicates at least one of: a sidelink beam measurement, a beam failure indicator ratio, a number of consecutive beam failure indicator, one or more sidelink channel condition measurements, a sidelink beam failure detection status, or a preferred beam.

Aspect 35: The method of any one of Aspects 23-34, wherein receiving the sidelink beam report further comprises: receiving the sidelink beam report in an access link medium access control (MAC) control element (CE).

Aspect 36: The method of any one of Aspects 23-35, wherein receiving the sidelink beam report further comprises: receiving the sidelink beam report in uplink control information.

Aspect 37: The method of any one of Aspects 23-36, wherein receiving the sidelink beam report further comprises: receiving the sidelink beam report aperiodically.

Aspect 38: The method of any one of Aspects 23-37, further comprising at least one of: transmitting a first indication to activate sidelink beam reporting; or transmitting a second indication to deactivate the sidelink beam reporting.

Aspect 39: The method of Aspect 38, wherein transmitting the first indication to activate the sidelink beam reporting is based at least in part on at least one of: a quality of service (QoS) requirement associated with the first UE or the second UE, or a discontinuous reception (DRX) configuration associated with the first UE or the second UE.

Aspect 40: The method of Aspect 38 or Aspect 39, wherein transmitting the first indication or transmitting the second indication further comprises: transmitting the first indication or the second indication in an access link medium access control (MAC) control element (CE); or transmitting the first indication or the second indication in downlink control information.

Aspect 41: The method of any one of Aspects 23-40, further comprising: receiving a request to activate sidelink beam reporting.

Aspect 42: The method of Aspect 41, wherein receiving the request further comprises: receiving the request in an access link medium access control (MAC) control element (CE); or receiving the request in uplink control information.

Aspect 43: An apparatus for wireless communication at a device, comprising a processor; memory coupled with the processor; and instructions stored in the memory and executable by the processor to cause the apparatus to perform the method of one or more of Aspects 1-22.

Aspect 44: An apparatus for wireless communication at a device, comprising a processor; memory coupled with the processor; and instructions stored in the memory and executable by the processor to cause the apparatus to perform the method of one or more of Aspects 23-42.

Aspect 45: A device for wireless communication, comprising a memory and one or more processors coupled to the memory, the one or more processors configured to perform the method of one or more of Aspects 1-22.

Aspect 46: A device for wireless communication, comprising a memory and one or more processors coupled to the memory, the one or more processors configured to perform the method of one or more of Aspects 23-42.

Aspect 47: An apparatus for wireless communication, comprising at least one means for performing the method of one or more of Aspects 1-22.

Aspect 48: An apparatus for wireless communication, comprising at least one means for performing the method of one or more of Aspects 23-42.

Aspect 49: A non-transitory computer-readable medium storing code for wireless communication, the code comprising instructions executable by a processor to perform the method of one or more of Aspects 1-22.

Aspect 50: A non-transitory computer-readable medium storing code for wireless communication, the code comprising instructions executable by a processor to perform the method of one or more of Aspects 23-42.

Aspect 51: A non-transitory computer-readable medium storing a set of instructions for wireless communication, the set of instructions comprising one or more instructions that, when executed by one or more processors of a device, cause the device to perform the method of one or more of Aspects 1-22.

Aspect 52: A non-transitory computer-readable medium storing a set of instructions for wireless communication, the set of instructions comprising one or more instructions that, when executed by one or more processors of a device, cause the device to perform the method of one or more of Aspects 23-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   a memory; and
   one or more processors, coupled to the memory, configured to:
   communicate with a second UE using a sidelink channel and a first beam;
   transmit a sidelink beam report associated with the first beam to a network entity;
   receive sidelink configuration information from the network entity that indicates to change from using the sidelink channel and the first beam to using the sidelink channel and a second beam; and
   communicate with the second UE using the sidelink channel and the second beam.

2. The apparatus of claim 1, wherein the one or more processors, to receive the sidelink configuration information that indicates to change from using the sidelink channel and the first beam to using the sidelink channel and the second beam, are configured to:
receive the sidelink configuration information prior to detecting a sidelink beam failure associated with the first beam.

3. The apparatus of claim 1, wherein the one or more processors are further configured to:
receive, prior to communicating with the second UE using the sidelink channel, initial sidelink configuration information from the network entity, wherein the initial sidelink configuration information indicates at least one of:
a beam identifier (ID) associated with the first beam,
a sidelink beam report configuration,
sidelink grant information, or
a sidelink beam sweeping configuration.

4. The apparatus of claim 3, wherein the sidelink beam report configuration indicates content to include in the sidelink beam report.

5. The apparatus of claim 4, wherein the sidelink beam report configuration indicates, as the content to include in the sidelink beam report, at least one of:
a sidelink beam measurement,
a beam failure indicator ratio,
a number of consecutive beam failure indicators,
one or more sidelink channel condition measurements,
a sidelink beam failure detection status, or
a preferred beam.

6. The apparatus of claim 1, wherein the one or more processors, to transmit the sidelink beam report, are configured to:
transmit the sidelink beam report based at least in part on detecting a trigger event, the trigger event comprising:
detection of a beam failure; or
detection a beam failure warning.

7. The apparatus of claim 1, wherein the one or more processors are further configured to at least one of:
receive a first indication to activate sidelink beam reporting; or
receive a second indication to deactivate the sidelink beam reporting.

8. The apparatus of claim 1, wherein the one or more processors are further configured to:
transmit, to the network entity, a request to activate sidelink beam reporting.

9. The apparatus of claim 8, wherein the one or more processors, to transmit the request to activate the sidelink beam reporting, are further configured to transmit the request based at least in part on at least one of:
a quality of service (QoS) requirement associated with the first UE,
a power capability associated with the first UE, or
a discontinuous reception (DRX) configuration associated with the first UE.

10. An apparatus for wireless communication at a network entity, comprising:
a memory; and
one or more processors, coupled to the memory, configured to:
transmit sidelink configuration information to a first user equipment (UE) or a second UE, the sidelink configuration information indicating to communicate using a sidelink channel between the first UE and the second UE and using a first beam;
receive a sidelink beam report associated with the sidelink channel; and
transmit updated sidelink configuration information to the first UE or the second UE, the updated sidelink configuration information at least indicating to communicate using the sidelink channel based at least in part on changing from the first beam a second beam.

11. The apparatus of claim 10, wherein the one or more processors, to transmit the updated sidelink configuration information, are configured to:
transmit the updated sidelink configuration information prior to receiving an indication of sidelink beam failure associated with the first beam.

12. The apparatus of claim 10, wherein the sidelink configuration information indicates at least one of:
a beam identifier (ID) associated with the first beam,
a sidelink beam report configuration,
sidelink grant information, or
a sidelink beam sweeping configuration.

13. The apparatus of claim 12, wherein the sidelink configuration information indicates the sidelink beam report configuration, wherein the sidelink beam report configuration is a first sidelink beam report configuration, and the one or more processors are further configured to:
transmit an indication to switch from the first sidelink beam report configuration to a second sidelink beam report configuration.

14. The apparatus of claim 10, wherein the sidelink beam report indicates at least one of:
a sidelink beam measurement,
a beam failure indicator ratio,
a number of consecutive beam failure indicator,
one or more sidelink channel condition measurements,
a sidelink beam failure detection status, or
a preferred beam.

15. The apparatus of claim 10, wherein the one or more processors are further configured to at least one of:
transmit a first indication to activate sidelink beam reporting; or
transmit a second indication to deactivate the sidelink beam reporting.

16. The apparatus of claim 15, wherein the one or more processors, to transmit the first indication to activate the sidelink beam reporting, are further configured to transmit the first indication based at least in part on at least one of:
a quality of service (QoS) requirement associated with the first UE or the second UE, or
a discontinuous reception (DRX) configuration associated with the first UE or the second UE.

17. The apparatus of claim 10, wherein the one or more processors are further configured to:
receive a request to activate sidelink beam reporting.

18. A method of wireless communication performed by a first user equipment (UE), comprising:
communicating with a second UE using a sidelink channel and a first beam;
transmitting a sidelink beam report associated with the first beam to a network entity;
receiving sidelink configuration information from the network entity that indicates to change from using the sidelink channel and the first beam to using the sidelink channel and a second beam; and
communicating with the second UE using the sidelink channel and the second beam.

19. The method of claim 18, wherein receiving the sidelink configuration information that indicates to change from using the sidelink channel and the first beam to using the sidelink channel and the second beam further comprises:

receiving the sidelink configuration information prior to detecting a sidelink beam failure associated with the first beam.

20. The method of claim 18, wherein transmitting the sidelink beam report further comprises:
   transmitting the sidelink beam report based at least in part on detecting a trigger event, the trigger event comprising:
      detecting a beam failure; or
      detecting a beam failure warning.

* * * * *